(12) United States Patent
Joffroy

(10) Patent No.: US 10,539,124 B2
(45) Date of Patent: Jan. 21, 2020

(54) THERMODYNAMIC BOILER WITH THERMAL COMPRESSOR

(71) Applicant: BOOSTHEAT, Venissieux (FR)

(72) Inventor: Jean-Marc Joffroy, Cabanes (FR)

(73) Assignee: BOOSTHEAT, Venissieux (FR)

( * ) Notice: Subject to any disclaimer, the term of this patent is extended or adjusted under 35 U.S.C. 154(b) by 0 days.

(21) Appl. No.: 15/770,482

(22) PCT Filed: Oct. 20, 2016

(86) PCT No.: PCT/EP2016/075271
§ 371 (c)(1),
(2) Date: Apr. 23, 2018

(87) PCT Pub. No.: WO2017/068066
PCT Pub. Date: Apr. 27, 2017

(65) Prior Publication Data
US 2019/0055932 A1 Feb. 21, 2019

(30) Foreign Application Priority Data

Oct. 23, 2015 (FR) ..................... 15 60169

(51) Int. Cl.
*F04B 25/00* (2006.01)
*F24H 9/00* (2006.01)
(Continued)

(52) U.S. Cl.
CPC ............ *F04B 25/00* (2013.01); *F04B 35/002* (2013.01); *F24D 11/0228* (2013.01);
(Continued)

(58) Field of Classification Search
CPC ........ F04B 25/00; F04B 35/002; F04B 35/00; F24D 17/02; F24D 11/0235; F24D 11/0228; F24D 2200/123; F24D 2200/11; F24D 2200/043; F25B 9/14; F25B 9/008; F24H 9/0084; Y02B 30/52; Y02B 10/40; Y02B 10/70
(Continued)

(56) References Cited

U.S. PATENT DOCUMENTS 2,157,229 A 5/1939 Bush
3,412,815 A * 11/1968 Jones ..................... E21B 7/10
166/254.2
(Continued)

FOREIGN PATENT DOCUMENTS

DE 102011118042 A1 5/2013
EP 2273203 A2 1/2011

*Primary Examiner* — Hoang M Nguyen
(74) *Attorney, Agent, or Firm* — Seed Intellectual Property Law Group LLP

(57) ABSTRACT

A thermodynamic boiler for exchanging (providing or drawing) heat with a heating circuit includes a thermal compressor. The thermal compressor acts on a compressible fluid and includes at least one compression stage, with an alternating bi-directional piston separating a first chamber and a second chamber, and a first fuel burner forming a heat source coupled to the first chamber. The thermal compressor uses the heating circuit as a cold source coupled to the second chamber and forms the compression function of a reversible heat pump type loop.

16 Claims, 7 Drawing Sheets

Figure 1:
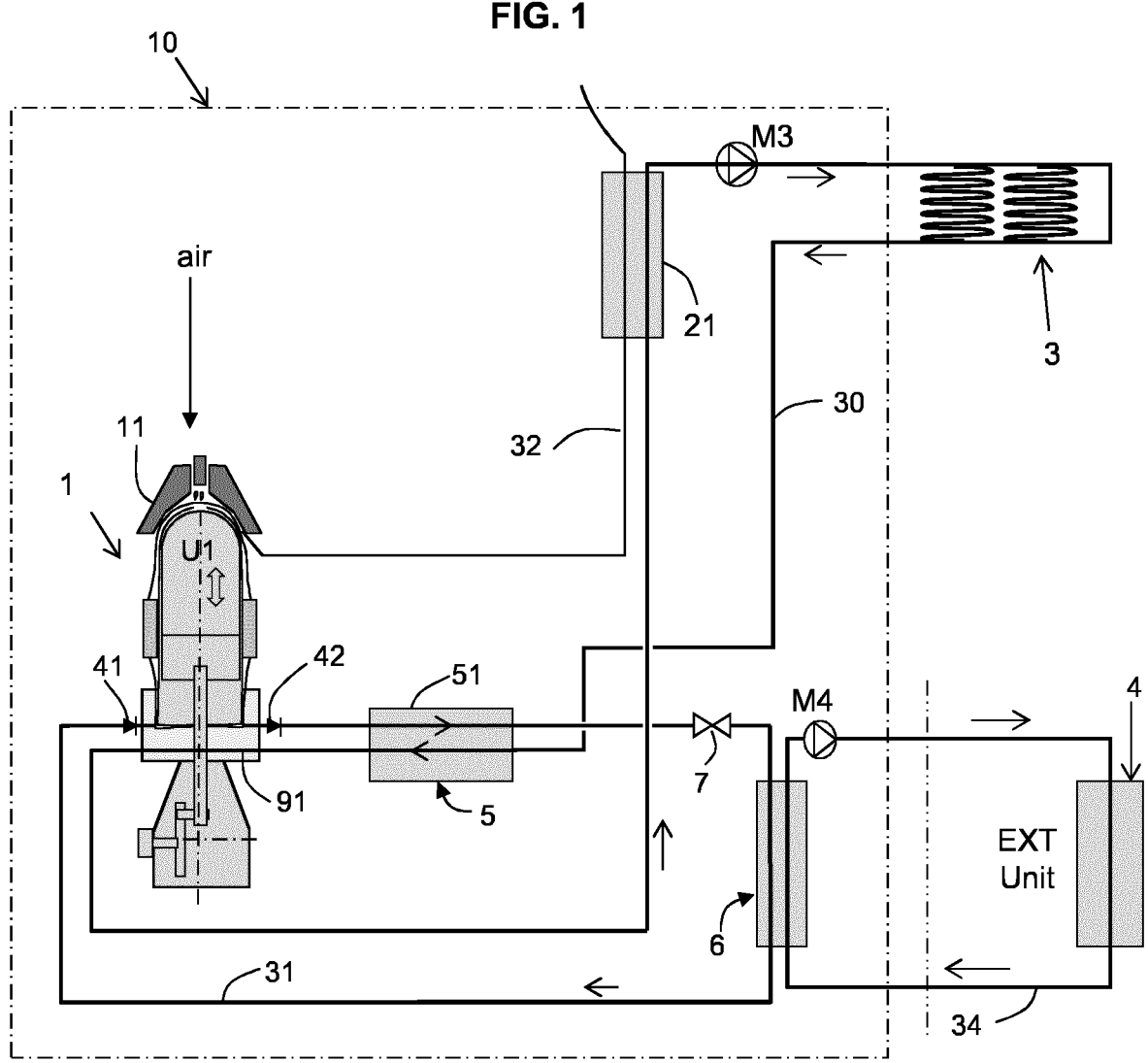

(51) Int. Cl.
  *F25B 9/00* (2006.01)
  *F25B 9/14* (2006.01)
  *F24D 11/02* (2006.01)
  *F24D 17/02* (2006.01)
  *F04B 35/00* (2006.01)

(52) U.S. Cl.
  CPC .......... *F24D 11/0235* (2013.01); *F24D 17/02* (2013.01); *F24H 9/0084* (2013.01); *F25B 9/008* (2013.01); *F25B 9/14* (2013.01); *F24D 2200/043* (2013.01); *F24D 2200/11* (2013.01); *F24D 2200/123* (2013.01)

(58) Field of Classification Search
  USPC .................................................. 60/517–526
  See application file for complete search history.

(56) References Cited

U.S. PATENT DOCUMENTS

| | | | |
|---|---|---|---|
| 3,656,295 A * | 4/1972 | Fokker | F02G 1/055 60/524 |
| 3,813,881 A * | 6/1974 | Neelen | F02G 1/043 60/521 |
| 4,885,017 A * | 12/1989 | Fleischmann | F25B 9/14 62/6 |
| 5,729,988 A | 3/1998 | Tchernev | |
| 6,701,721 B1 * | 3/2004 | Berchowitz | F02G 1/0435 60/520 |
| 7,637,457 B2 * | 12/2009 | Bennett | B64C 39/024 244/59 |
| 9,038,390 B1 * | 5/2015 | Kreuger | F01K 23/02 60/655 |
| 9,273,630 B2 | 3/2016 | Joffroy | |
| 9,273,681 B2 | 3/2016 | Joffroy | |
| 2007/0044467 A1 * | 3/2007 | Ziph | F02G 1/044 60/520 |
| 2016/0076950 A1 | 3/2016 | Jacquet | |

* cited by examiner

THERMODYNAMIC BOILER WITH THERMAL COMPRESSOR

The present invention relates to heating systems that include devices known as boilers. The invention particularly relates to thermodynamic boilers benefitting from a device called a heat pump (abbreviated "HP").

CONTEXT AND PRIOR ART

Several technical solutions already exist for implementing a heat pump device in the context of a boiler.

First of all, the use of electric compressors to compress and circulate a heat transfer working fluid is known. These compressors are also known as "electric HPs". However, the efficiency of these systems sharply decreases as the external temperature lowers, which in most cases leads to having a supplementary conventional fuel burner.

Gas engine heat pumps ("gas engine HP") are also known. This system involves the use of an internal combustion engine which is noisy and requires regular maintenance.

Adsorption/desorption gas heat pumps are also known, such as, for example, those using a water/ammonia or water/zeolite pair, for example from document U.S. Pat. No. 5,729,988-Tchernev. But these devices are complex and expensive; They also use materials that are potentially polluting or harmful.

In addition, it is generally preferable for this type of boiler to be power adaptable and to also be designed to supply domestic hot water (known as "DHW").

In addition, most of the systems described above can generally be operated in reverse, in cooling mode.

Considering the aforementioned disadvantages, there is a need to propose improved solutions for thermodynamic boiler systems with a heat pump effect.

For this purpose, a thermodynamic boiler is proposed for exchanging heat with at least one heating circuit, comprising a thermal compressor, the thermal compressor acting on a compressible fluid and comprising at least one compression stage with an alternating bi-directional piston separating a first chamber and a second chamber and a first fuel burner forming a heat source coupled to the first chamber, and using the heating circuit as a cold source coupled to the second chamber, the thermal compressor forming the compression function of a reversible heat pump type loop, the first and second chambers being fluidly connected between each other through a regenerator with a to-and-fro fluid movement.

Through such provisions, the invention benefits from a direct transfer of heat between the burner and the working fluid to be compressed, the compressor is simple and compact, and the reversible heat pump type loop can be used either to provide heat to the heating circuit in heating mode ("winter" mode), or in some cases to draw heat from the heating circuit in cooling mode ("summer" mode).

In addition, such a boiler requires very little maintenance and maintenance operations can be substantially spaced apart.

Note 1: Regarding the vocabulary used in the present document, it should be noted that heating circuit can be broadly interpreted as a circuit mainly for exchanging heat with an entity of interest, most often a premises, the objective being to heat or cool the entity of interest.

Note 2: In the abovementioned heat pump type loop, a compressible two-phase heat transfer fluid is used, and the invention benefits from an evaporation phenomenon on one exchanger and a condensation phenomenon on another exchanger.

According to a configuration, known as heating, the thermodynamic boiler supplies heat to the heating circuit ("heating" or "winter" mode), and the reversible heat pump type loop draws heat from an external unit.

Under these conditions, from the point of view of thermal efficiency, all energy expended at the burner is either used directly for compression or is distributed into the heating circuit. In addition, compression and the associated fluid circuit induce the drawing of "free" heat outside. Consequently, a very satisfactory performance coefficient is obtained under these conditions.

In various embodiments of the invention, one may possibly also have recourse to one and/or the other of the following arrangements.

According to one aspect of the invention, the thermodynamic boiler may comprise a supplementary device, the supplementary device comprising an auxiliary burner, distinct from the first burner, and a supplementary exchanger arranged on the heating circuit. The invention thus ensures, on the one hand, operation under very cold external temperature conditions, or if the HP circuit is unavailable and, on the other hand, the passing of peak requirements, particularly for domestic hot water together with heating needs.

According to one aspect of the invention, the fuel is advantageously gas. Advantageously either gas of fossil sources or bio gas is used.

According to one aspect of the invention, the compressible heat transfer fluid is CO2; This is an available, non-polluting and safe fluid.

According to one aspect, a modulation unit and a motor (electromagnetic actuator linked to the piston movement) are advantageously provided to regulate (increase and/or decrease) the compressor rotation speed. Such power modulation enables an ideal compromise between comfort and seasonal performance to be obtained, and maximizes the utilization rate of the HP.

According to one aspect, the heat pump type loop comprises two cascaded circuits, i.e., a compressible gas work circuit (31,1,5,7,6) and a glycol water circuit (34,4,6); which enable a compressible gas work circuit to be confined within a factory-sealed boiler assembly, which frees the plumber or installer from having to deal with the leakproofness of this circuit; this is in contrast to the glycol water circuit, which is easier to implement and can be installed by the plumber.

According to one aspect, the compressor may comprise at least two compression stages in series, i.e., at least one second compression stage U2, in addition to the first U1. As a consequence, a CO2 (R744) type fluid can be used, with large excursions in pressure and CO2 fluid temperatures adapted according to the temperatures of the water circuits to be heated. Good overall thermodynamic efficiency is thus obtained.

According to one aspect, the compressor may comprise 3 stages; As a consequence, the invention optimizes the spacing of pressure rises and the appropriateness of the CO2 fluid temperatures adapted according to the temperatures of the water circuits to be heated and the thermal power to be delivered.

The stages are advantageously independent. This facilitates sizing and increases the modulation capabilities of each stage.

The thermodynamic boiler comprises an air preheater at the inlet of the first burner; heat is recovered from the combustion fumes and is injected into the air bound for the burner; This improves the overall performance coefficient.

The thermodynamic boiler comprises a main exchanger (5) forming the essential thermal interface between the compressible fluid circuit (31) and the heating circuit (30), and the compressor is cooled by the heating circuit return that first passes in at least one main exchanger 5, and then in the cold section of the thermal compressor; this is the best choice for good system performance and efficiency.

Moreover, after cooling the compressor, the heating circuit return goes into the supplementary exchanger. In this way the heat supplied to the heating circuit is maximized.

The main exchanger comprises a high temperature "HT" exchanger and a low temperature "LT" exchanger; therefore heat can be supplied to two different heating circuits, one with a high mean temperature (coupled to the HT) and the other with a moderate high mean temperature (coupled to the LT).

The thermodynamic boiler comprises a domestic hot water circuit; The boiler can thus fulfill all domestic boiler functions.

The domestic hot water is heated by means of the high temperature exchanger (50) which is arranged on the compressible fluid circuit directly at the outlet of the thermal compressor; This contributes to the priority given to domestic hot water.

According to one configuration, known as cooling, the thermodynamic boiler takes heat from the heating circuit 30, and delivers this heat either into the domestic hot water DHW circuit or into the external unit 4 (summer mode); Therefore the boiler can provide a cooling function, and also energy free domestic hot water.

Figure 2:
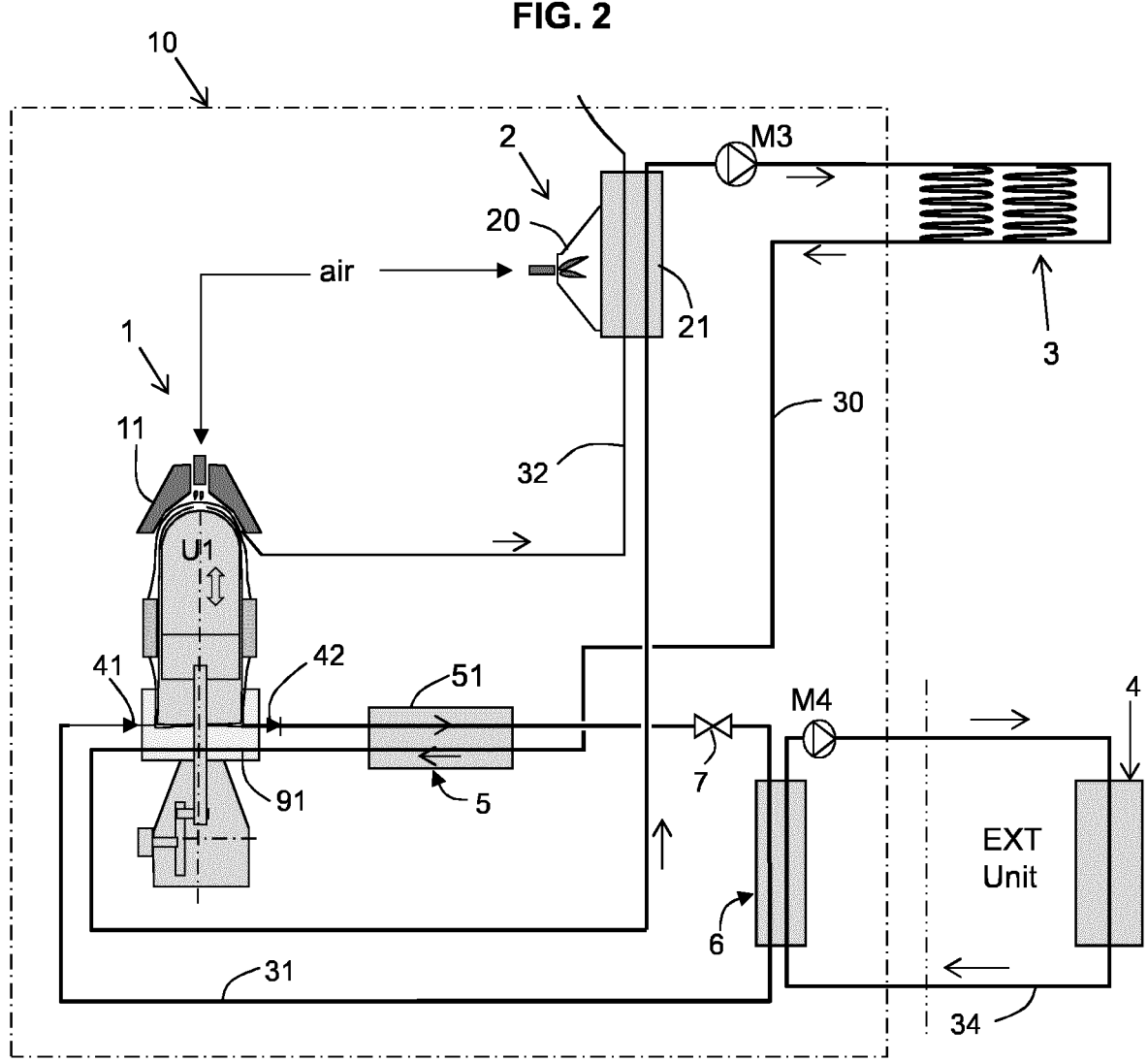
Figure 3:
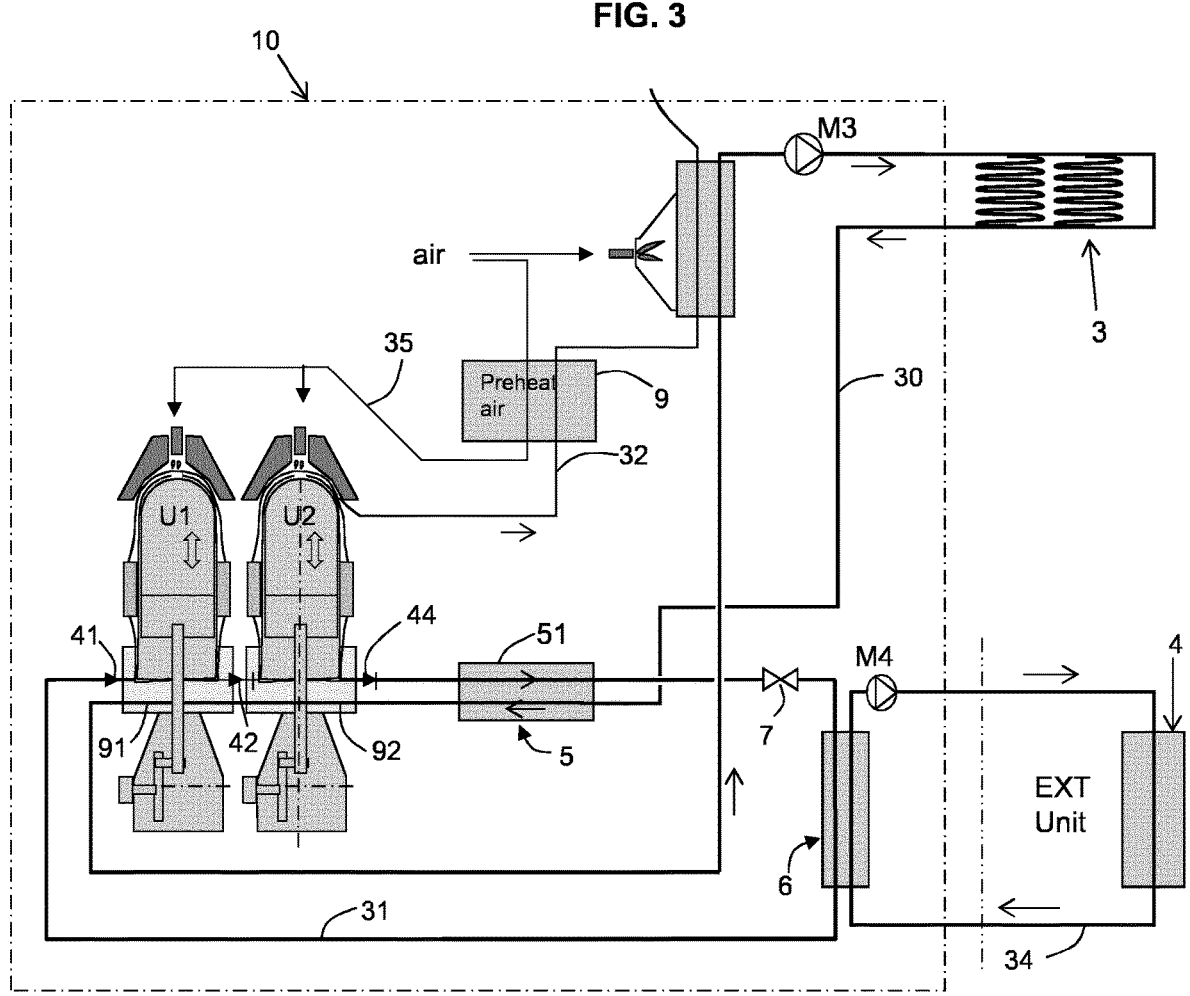
Figure 4:
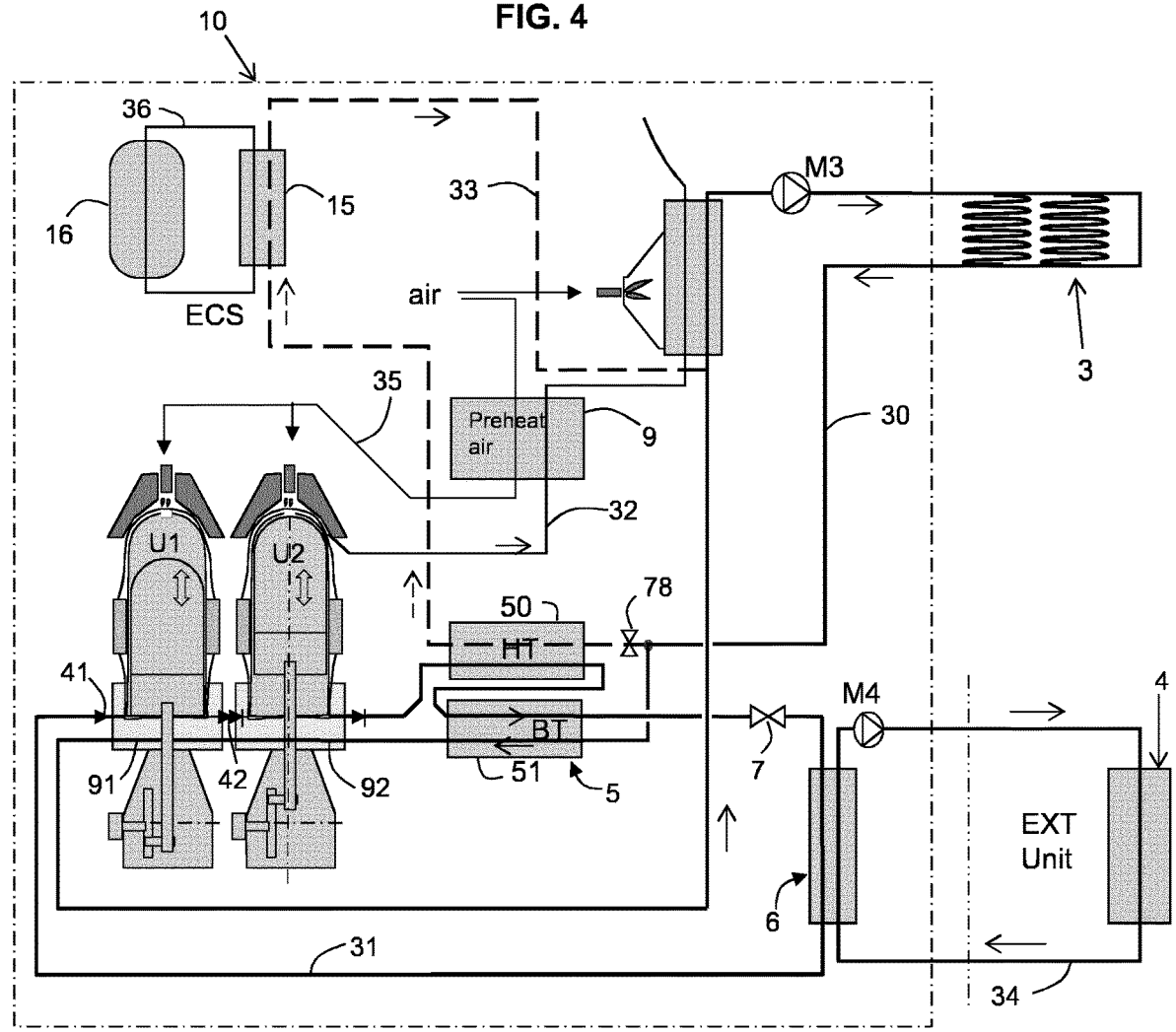
Figure 5:
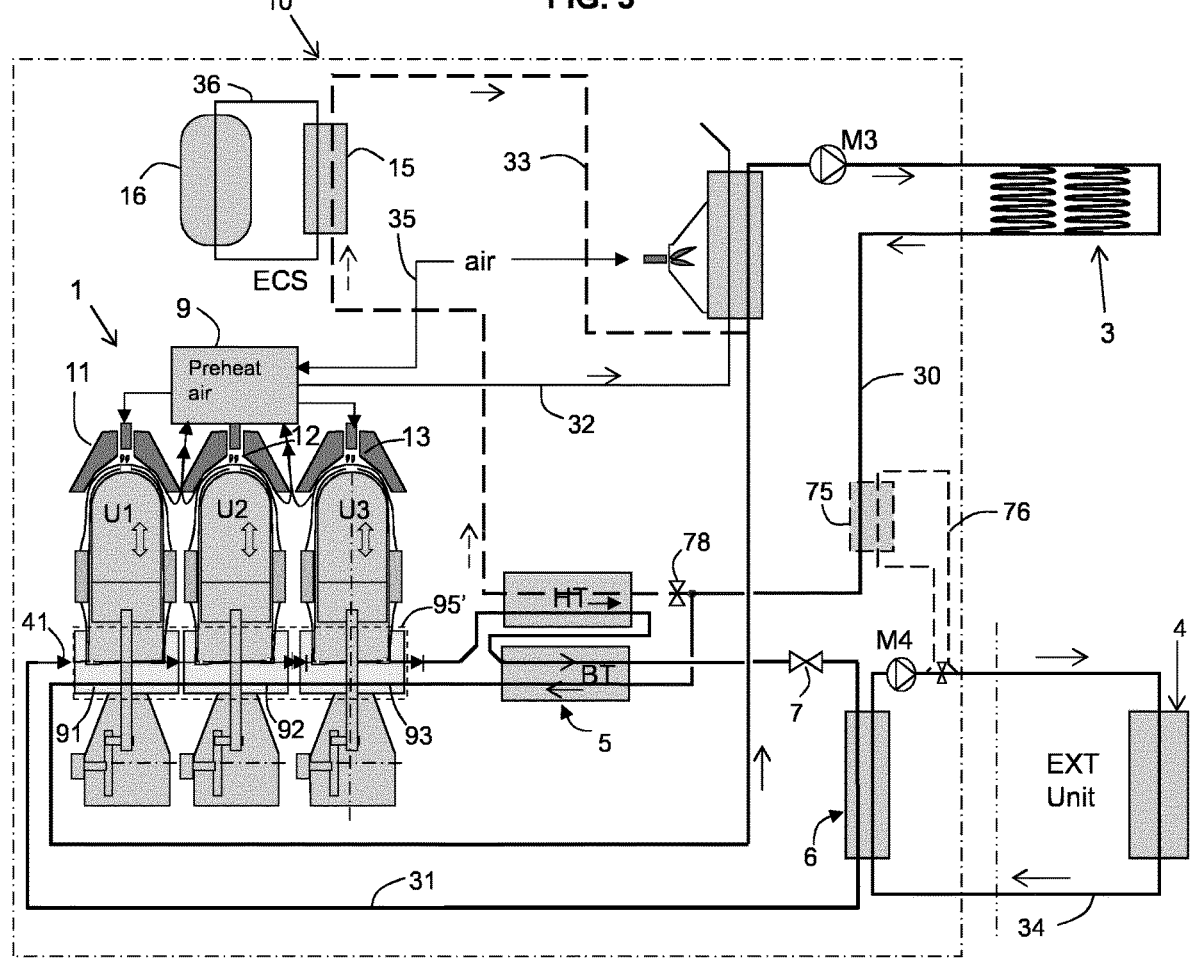
Figure 6:
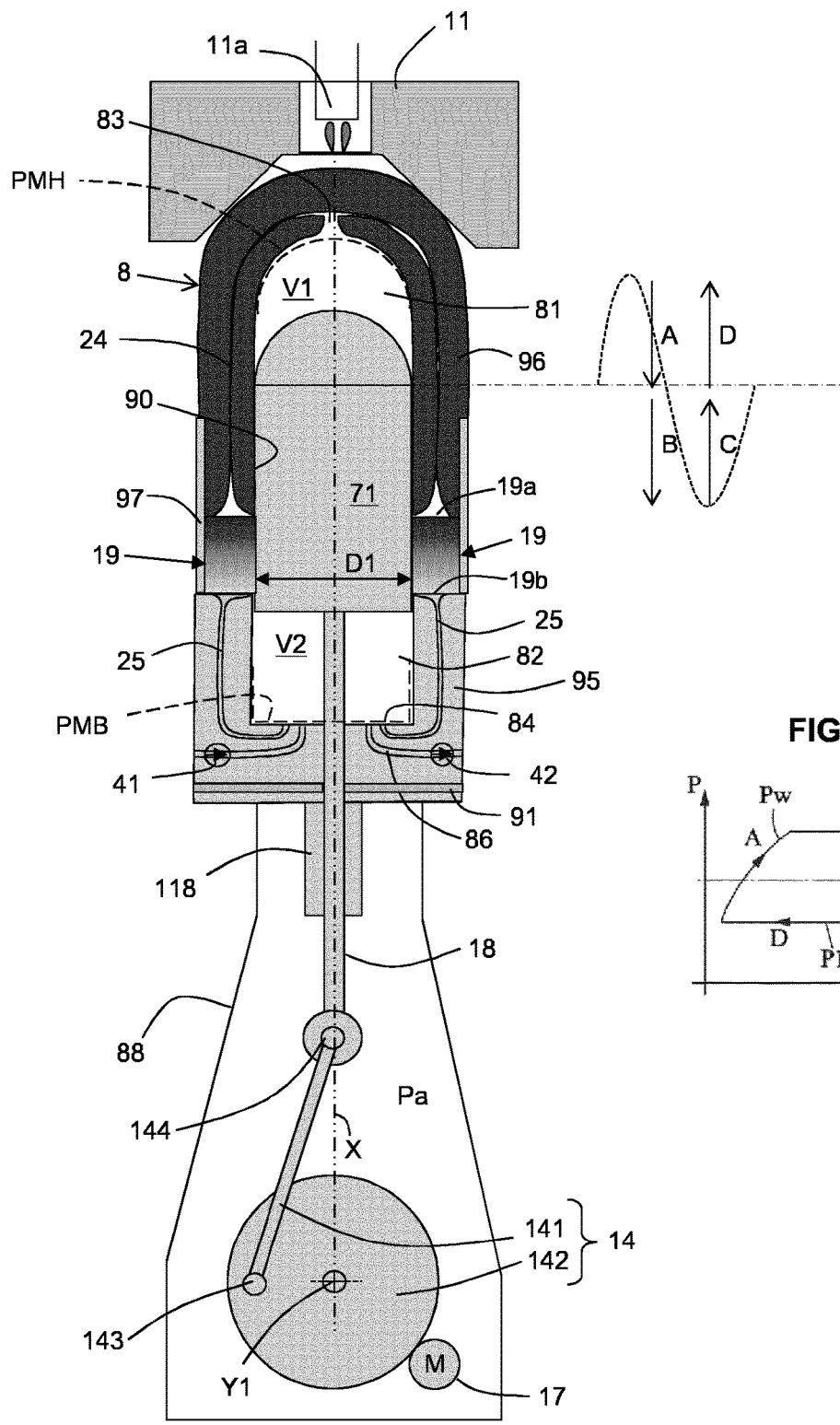
Figure 7:
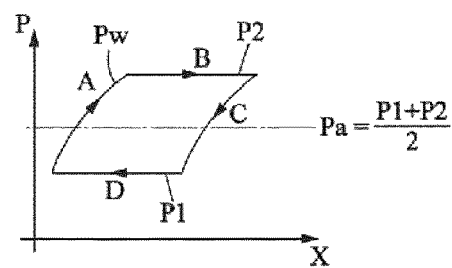
Figure 8:
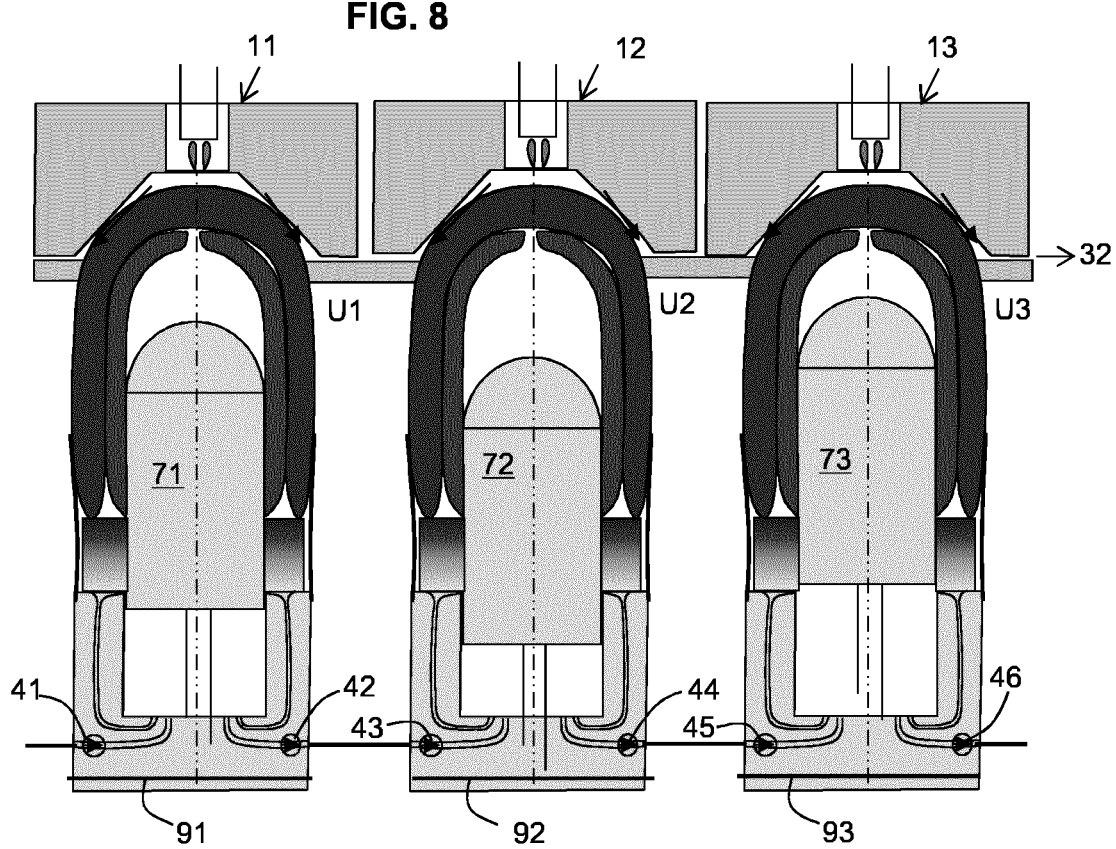
Figure 9:
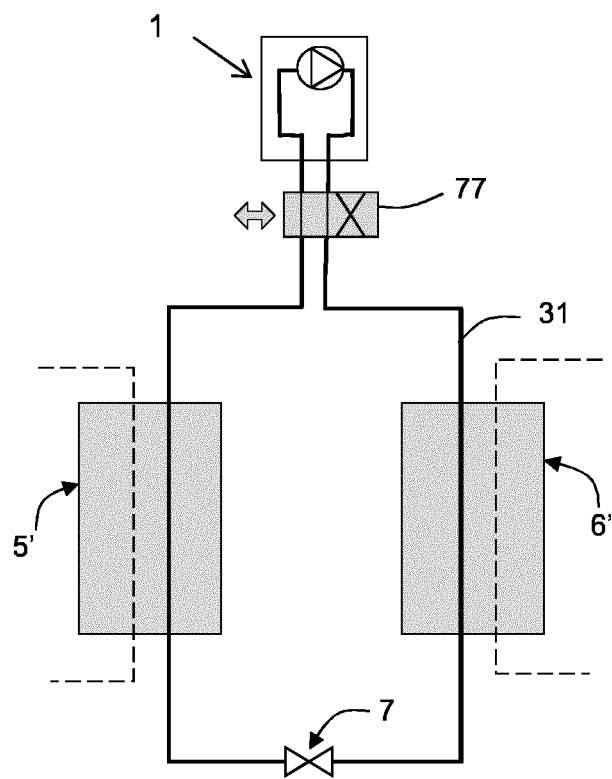

Other aspects, objects and advantages of the invention will appear upon reading the following description of an embodiment of the invention, given by way of a non-limiting example. The invention will also be better understood in regard to the appended drawings in which:

FIG. 1 schematically represents a heating system comprising a boiler according to the invention, FIG. 2 represents a system similar to FIG. 1, the boiler being a hybrid and including a supplementary burner, FIG. 3 represents a system similar to FIG. 1, in which an air preheating exchanger is provided and the boiler compressor comprises two compression stages, FIG. 4 represents a system similar to FIG. 3, in which the provision of domestic hot water is also ensured, FIG. 5 represents a system similar to FIG. 4, the boiler compressor comprising three compression stages, FIG. 6 represents a stage in further detail, i.e., a compression unit used in the thermal compressor, FIG. 7 represents the thermodynamic cycle in a stage, FIG. 8 represents the central parts of a compressor in the three-stage configuration, FIG. 9 represents a very general diagram of the use of a thermal compressor according to the invention in a reversible heat pump type loop, usable in heating and in cooling modes.

In the various figures, the same references designate identical or similar elements.

FIG. 1 shows an overview of a heating system typically provided to heat industrial premises or individual or collective housing. The heating system comprises a boiler 10 that will be described subsequently.

The system comprises a heating circuit marked 30; As stated at the beginning, the term "heating circuit" does not preclude that this circuit takes heat; however in the first example as illustrated, the heating circuit comprises heat receiving entities 3 in the form of radiators/convectors 3 and/or underfloor heating, situated in the rooms of the premises to be heated.

There may be several heat receiving entities, for example one at low temperature (underfloor heating) and the other at higher temperature (convectors, domestic hot water). A circulator M3 circulates water in the heating circuit 30.

The case where one heat receiving entity is a pool or greenhouse can also be considered. In addition, the heating system may be used in an industrial context with the heat receiving entity in the form of industrial process equipment.

Boiler 10 comprises a thermal compressor 1 which constitutes the motive power component of a heat pump circuit. In the example illustrated, only the external unit marked 4 is arranged outside the premises (building, housing, etc.). The rest of the main components are arranged inside the premises, or even in the boiler 10 casing.

It is noted that in the figures, pipework is represented symbolically.

The heat pump device comprises, on the one hand, a glycol water circuit 34 that circulates in the external unit 4, and a working fluid circuit 31 which goes through compressor 1. In the example illustrated, the working fluid is R744, otherwise known as CO2, but another fluid with similar properties can be chosen. In order to distinguish other fluids, the working fluid in circuit 31 will subsequently be called the "compressible" fluid, also known as refrigerant fluid in the art. This is opposed to the fluid that circulates outward in the external unit (circuit 34) that is mainly water-based (glycol water) and also opposed to the fluid that circulates in the heating circuit 30 already mentioned that is also mainly water-based, and therefore not compressible.

The various fluids used in circuits 31, 31, 34 are heat transfer fluids, whether compressible or not, they transfer heat mainly from the external unit 4 to the receiving entities 3, but also from burner 11 of the compressor to receiving entities 3.

The cooling mode, also possible, will be described later.

It should be noted that external unit 4 can be an aerothermal unit or a geothermal unit.

It is observed that capturing external heat by the heat pump effect uses two fluid circuits in series that are interfaced by exchanger 6, also called interface exchanger 6, which is preferably a cross flow exchanger. The glycol water circuit 34 comprises a circulator M4, recovers heat from external unit 4 and delivers this heat to interface exchanger 6. It is noted that the compressible fluid circuit assembly 31, i.e., the CO2 assembly, is confined inside boiler 10 which is prepared in a manufacturing plant; Only the glycol water circuit 34 must be applied by a professional onto the target installation.

In addition, the heat pump device comprises an expansion device 7, known in itself, which plays the opposite role of the compressor for pressure, and a main exchanger 5 that thermally couples the compressible fluid circuit at the compressor outlet with the heating circuit 30. Main exchanger 5 is preferably configured to be a cross flow exchanger. Instead of a single exchanger 51 as represented, the main exchanger may be constituted of several exchangers, either in parallel, or in series as will be seen later.

The compressible fluid circuit 31 contains fluid in two-phase form that recovers heat from interface exchanger 6 (the side called "evaporator" where the two-phase fluid passes from the liquid state to the vapor state) and delivers this heat to the main exchanger 5 (the side called "condenser" where the two-phase fluid passes from the vapor state to the liquid state).

It is noted that the heating circuit return 30 first passes through this main exchanger 5 and then is directed to the cold zone of the compressor at the location from which the heating circuit fluid cools the compressor 1.

It is noted that the burned gas outlet circuit (noted 32) of burner 11 passes to the inside of an exchanger 21 coupled with the heating circuit, at the location of which the fumes give up their heat to the fluid of the main heating circuit 30; Later we will see that this exchanger can also be called in certain cases a "supplementary exchanger" 21.

The quantity of gas introduced and burned by burner 11 is controlled by a unit for regulating (not represented) the boiler.

Burner 11 is typically sized to be able to deliver up to 6 kW; In practice when the compressor is operating, the regulation adjusts the power to between 2 kW and 6 kW.

More specifically for compressor 1, with reference to FIG. 6, it is a thermal compressor known as a "regenerative" compressor with a heat provision zone (hot zone), a cooling zone (cold zone), and a contained enclosure 8 that communicates with the outside thanks to 2 non-return valves, i.e., an inlet valve 41 (admission) and an outlet valve 42 (backflow).

In the example from FIG. 1, there is only a single compression stage noted U1.

In the contained enclosure 8, the compressible fluid occupies a practically constant volume, and a displacer piston 71 is configured therein to alternatively displace, from top to bottom in the example illustrated, in order to displace most of the volume of compressible fluid to the hot zone or to the cold zone. The piston is connected to a rod and crankshaft drive system in a self-driving system which will be seen later.

As represented in FIG. 6, the compressor is structured around an axial direction X, which is preferably disposed vertically, but another arrangement is not ruled out. Piston 71, movably mounted in cylindrical liner 90, can be displaced along this axis. Said piston separates first chamber 81 from second chamber 82, these two chambers being included in working enclosure 8 with the sum of their volumes V1+V2 being substantially constant. Piston 71 presents an upper portion in the form of a dome, for example hemispherical.

Working enclosure 8 is structurally contained in an assembly formed of a hot casing 96 and a cold cylinder head 95, with the interposition of a thermal insulation ring 97.

The first chamber 81, also known as the "hot chamber," is arranged above the piston and is thermally coupled to a heat source 11 (a fuel burner 11) which supplies heat directly to the gaseous fluid in the first chamber 81. The first chamber is axisymmetric with a cylindrical portion of a diameter corresponding to the diameter D1 of the piston and a hemispherical portion in the upper part, which comprises a central opening 83 for the inlet and outlet of the compressible fluid. The heat source 11 forms a cap entirely surrounding the hot chamber 81, with a burner injector 11a.

The second chamber 82, also known as the "cold chamber," is arranged below the piston and is thermally coupled to a cold source (here the heating circuit 91 return) to thereby transfer heat from the compressible fluid to the heating circuit. The second chamber is cylindrical, with a diameter D1, and comprises several openings 84 circling around the axis, under the piston, for the inlet and outlet of the compressible fluid.

A regenerative heat exchanger 19, of the type conventionally used in thermodynamic machines of the Stirling engine type, is arranged around the wall of cylindrical liner 90. This exchanger 19 (which will simply be called "regenerator" below) comprises fluid channels with narrow cross sections and elements for storing thermal energy and/or a dense network of metal wires. This regenerator 19 is arranged mid-height between the upper end and the lower end of the enclosure and presents a hot side 19a towards the top and a cold side 19b towards the bottom.

Inside the regenerator, a significant temperature gradient is observed between the hot side and the cold side, the hot side having a temperature close to the temperature of the burner cap, i.e., 700° C., the cold side having a temperature close to the temperature of the heating circuit, i.e., a temperature of between 30° C. and 70° C. depending on the entity or entities present on the heating circuit.

An annular running gap 24 arranged against the inner surface of the hot casing 96 connects opening 83 of the first chamber to the hot side 19a of the regenerator.

Channels 25 in cylinder head 95 connect openings 84 of the second chamber to the cold side 19b of the regenerator.

Therefore, when the piston moves up, the compressible gas is dispelled from the first chamber 81 by running gap 24, regenerator 19 and channels 25 in the direction of the second cold chamber 82. Conversely, when the piston moves down, the compressible gas is dispelled from the second cold chamber 82 by channels 25, regenerator 19 and running gap 24, in the direction of the first chamber 81.

Stated otherwise the first and second chambers (81, 82) are fluidly connected between each other through the regenerator (19) with a to-and-fro fluid movement.

The operation of the compressor is ensured by the alternating movement of the piston 71 between the bottom dead center PMB and the top dead center PMH, as well as by the action of a suction valve 41 on the inlet, and a backflow prevention valve 42 on the outlet. Different steps A, B, C, D, described below are represented in FIGS. 6 and 7.

Step A.

The piston, initially at the top, moves downward and the volume of the first chamber 81 increases while the volume of the second chamber 82 reduces. Because of this, the fluid is pushed through the regenerator 19 from bottom to top and is heated in the process. Pressure Pw simultaneously increases.

Step B.

When pressure Pw exceeds a certain value, the outlet valve 42 opens and pressure Pw settles at the compressed fluid discharge pressure P2, and fluid is expelled towards the outlet (the inlet valve 41 of course remains closed during this time). This continues until the piston reaches the bottom dead center.

Step C.

The piston now moves from the bottom upward and the volume of the second chamber increases while the volume of the first chamber decreases. Because of this, the fluid is pushed through the regenerator 19 from top downward and is cooled in the process. Pressure Pw simultaneously reduces. The outlet valve 42 closes when the upward movement begins.

Step D.

When pressure Pw drops below a certain value, the inlet valve 41 opens and pressure Pw settles at the fluid intake pressure P1, and fluid is drawn through the inlet (the outlet valve 42 of course remains closed during this time) This continues until the piston reaches the top dead center. The inlet valve 41 will close when the piston begins its descent.

Movements of the rod 18 are controlled by a self-driving device 14 acting on one end of the rod. This self-driving device comprises a flywheel 142, a connecting rod 141 connected to said flywheel by a pivoting connection, for example a roller bearing 143. The connecting rod is connected to the rod by another pivoting connection, for example a roller bearing 144.

The auxiliary chamber 88 is filled with gaseous working fluid at a pressure noted Pa. When the device is in operation, the pressure Pa in the auxiliary chamber 88 converges to an average pressure substantially equal to half the sum of the mini P1 and maxi P2 pressures. In fact, due to the reduced functional clearance between ring 118 and rod 18, in dynamic mode, this very slight leak does not affect operation and remains negligible.

When the flywheel rotates one turn, the piston sweeps a volume corresponding to the distance between the dead center and the bottom dead center, multiplied by the diameter D1.

The thermodynamic cycle, as represented in FIG. 7, provides positive work to the self-driving device.

However, for the initial start-up and to regulate the rotation speed, an electrical motor 17 is coupled to flywheel 142.

This motor can advantageously be housed in auxiliary chamber 88 or externally with a magnetic coupling to the wall.

Motor 17 is driven by a regulating unit, not represented in the figures; Controlling the motor enables the rotation speed of the flywheel to accelerate or decelerate, the thermal flows exchanged being practically proportional to the rotation speed of the flywheel. Thanks to motor 17, the regulating unit can adjust the rotation speed typically between 100 rpm and 500 rpm, preferentially within the range [200-300 rpm].

It is also noted that motor 17 serves to start the self-driving device 14.

It is noted that piston 71 is not a power receiving piston (unlike an internal combustion engine or a conventional Stirling engine) but is simply a displacer piston; power is supplied in the form of increasing the working gas pressure.

It is noted that V1+V2+Vchannel=Vtotal if variations in the volume of rod 18 are eliminated, V1 being the volume of the first chamber, V2 being the volume of the second chamber and Vchannel being the volume of conduits 24, 25. Preferably, arrangements are made to have the smallest possible dead volume with conduits of narrow cross section, for example Vchannel<10% of V1+V2 is obtained.

As illustrated in FIG. 2, the boiler may advantageously be a hybrid, i.e., it may contain an auxiliary burner 20, distinct from the first burner 11 and a supplementary exchanger 21. This auxiliary burner 20 will mainly be used in the event of operation in very cold external temperatures, and to pass the peak requirements from the heating installation (this together with domestic hot water when it is present, see below).

The auxiliary burner 20 of the supplementary exchanger is generally dimensioned to have a heat output of around 20 kW, typically for an individual house, which is much higher than the thermal power necessary for the compression function of the compressor as seen above.

More specifically, the regulating unit measures the external temperature, and various temperatures of the fluids in involved circuits (30, 31, 32, 34), to determine the need to operate the supplementary burner 20.

As already mentioned, the burned gas outlet circuit 32 of the first burner passes to the inside of supplementary exchanger 21, at the location of which it gives up its heat to the fluid of the main heating circuit 30.

It is noted that the fluid in heating circuit 30 receives its heat from main exchanger 5, 51 and from the cold part of the compressor (zone 91) and finally from the combustion gases burned in the supplementary exchanger 21. If auxiliary burner 20 is in operation, heat is also provided directly from auxiliary burner 20.

FIG. 3 illustrates two additional characteristics that may be present in the boiler of the invention.

First, two compression stages, in other words two compression units U1, U2 are installed in series, one U2 after the other U1, each having its own burner 11, 12.

The second stage U2 is similar or analogous on all points to the first stage U1; It comprises a burner 12, at the location of which the combustion of gas mixed with entering air is produced, and a displacer piston 72 similar to that of the first stage and whose movement and rotation speed are independent from the first. The sum of the power of the two burners 11, 12 can be dimensioned around 10 kW.

In practice, the outlet of the non-return valve 42 of the first stage is injected into the inlet non-return valve 43 of the second stage. In an integrated version where the cold parts are shared, valves 42, 43 are combined. The outlet of the second stage U2, i.e., valve 44, forms the outlet of compressor 1.

On the other hand, an air admission preheating exchanger, marked 9, can be provided, by which the invention benefits from the heat present in the exhaust exiting burners 11, 12 to preheat the cold air 35 flowing to the burner flames. Here preheating exchanger 9 is an air/air exchanger, known in itself, used with cross flows in the example illustrated.

The air arriving in injector 11a of burner 11 is thus at a temperature of between 100° C. and 300° C.

FIG. 4 illustrates, first, a main exchanger 5 formed by two serial (a characteristic that will be detailed below) exchangers and another additional characteristic, i.e., the supply of domestic hot water (abbreviated "DHW"). A domestic hot water reserve tank 16, known in itself and therefore not described in detail here, is provided. The water in this reserve tank is heated by the circulation of fluid 36 when it passes in a DHW exchanger 15.

A bypass branch 33 of the heating circuit 30 circulates in this DHW exchanger 15. This bypass branch draws heat from a high temperature (HT) main exchanger marked 50 and transmits it to the domestic hot water in DHW exchanger 15.

The flow of fluid that circulates in bypass branch 33 can be controlled by a regulating valve 78 that is known in itself. This flow is determined in proportion to the needs of the system regulating the domestic hot water reserve tank.

Here main exchanger 5 comprises two exchangers arranged in series on CO2 circuit 31: The "high" temperature exchanger 50 in which the bypass 33 configured to heat domestic hot water circulates, and the "low" temperature exchanger 51 that forms the main coupling of the CO2 circuit 31 with the heating circuit 30. It is noted that there can also be a combination of two exchangers (high and low) even without a domestic hot water circuit, for example if there are 2 heating receiver circuits, one low temperature and the other high temperature.

Typically, the mean temperature of the compressible fluid in high temperature exchanger 50 will be much higher than 100° C., while the mean temperature of the compressible fluid in the low temperature exchanger 51 will be substantially lower than the outlet temperature of the high temperature exchanger, most often lower than 150° or even preferentially lower than 100°.

FIG. 5 illustrates an additional characteristic, i.e., a configuration of three compression stages, in other words three compression units U1, U2, U3.

The invention plans to have a burner 11 on the first stage and a burner 12 on the second stage and a third burner 13 on the third stage U3. Each stage is similar to that written on the subject of FIG. 6. The sum of the power of the three burners 11, 12, 13 can be dimensioned around 13 kW or even 15 kW.

Advantageously, the stages operate independently, the rotation speed can be different from one stage to another; The second and third stages respectively have pistons noted 72, 73.

It is noted that the heating circuit cools the three cold zones of the compressors, by successive channels 93, 92 and 91.

The outlet of the first stage, i.e., valve 42 is connected to the inlet of the second stage, i.e., valve 43. The outlet of the second stage, i.e., valve 44 is connected to the inlet of the third stage, i.e., valve 45. The outlet of valve 46 forms the general outlet of compressor 1.

Pressure staging can typically be as follows, the admission pressure of the first stage U1 is on the order of 30 bar, the discharge pressure of the first stage (admission second stage) is on the order of 45 bar; the discharge pressure of the second stage U2 (admission third stage) is on the order of 60 to 65 bar; The outlet of the third stage U3 can be on the order of 90 bar.

It can be provided that the three cold zones of the three stages U1 U2 U3 form a single part called a cold cylinder head such as that shown in dashed lines 95' (FIG. 5).

Another optional characteristic of the boiler is illustrated in FIG. 5; A so-called de-icing exchanger marked 75 enables the glycol water circuit 34 to be directly coupled to the heating circuit 30, without involving the compressible gas circuit 31.

An auxiliary circuit 76 can be activated by a valve 74 (manual or controllable) which activates this de-icing exchanger.

As its name indicates, this de-icing exchanger 75 is used to de-ice the external unit 4 by transferring heat from the heating circuit.

It is noted that this exchanger can also be used in certain cases for passive cooling, according to the same principle of transferring heat from the heating circuit to the external exchanger.

In general, it is noted that the fuel used in the burner can be natural gas, or bio gas of plant or animal origin, or light hydrocarbon compounds from industrial oil processing waste.

As illustrated in FIG. 9, the thermal compressor 1 described above can be used within the context of the diagrams from FIGS. 1 to 5, of course in a heating mode, but also conversely in a cooling mode.

In this case, in this cooling mode, heat will be drawn from heating circuit 30 (for example at the underfloor heating) and the heat drawn will be directed either to the domestic hot water circuit 15, 16 or to the external unit 4.

This result can be obtained by reversing the role of the evaporation and condensation exchangers 5',6' on the compressible gas loop 31.

For reasons of clarity, four-way valve 77 that enables the fluid circulation directions to be reversed was not represented in FIGS. 1 to 5, but the principle is represented in FIG. 9 where four-way valve 77 presents a normal position known as heating mode and a special (reversed) position known as cooling mode.

When four-way valve 77 is in the normal position, the exchanger marked 6' operates in condenser mode and the exchanger marked 5' operates in evaporator mode.

Conversely, when valve 77 is in the reversed position, exchanger 5' operates in condenser mode and the exchanger marked 6' operates in evaporator mode.

In the boiler system, for reasons of clarity, certain components were not represented although they may also be present. In particular, these components are:
- expansion tanks on water circuits 34 30
- filling and drain cocks of the heating circuit
- filling and drain cocks of the CO2 circuit
- various pressure gauges and temperature sensors necessary for controlling the system by the regulating unit

SUMMARY OF CIRCUITS

30: heating circuit
31: compressible CO2 fluid
32: combustion fumes
33: bypass for DHW
34: glycol water (exchange with outside)
35: inlet of heated air
36: specific DHW circuit
76: de-icing bypass

The invention claimed is:

1. A thermodynamic boiler for exchanging heat with a heating circuit, the boiler comprising:
a compressible fluid circuit forming part of a reversible heat pump loop;
a thermal compressor, the thermal compressor acting on a compressible fluid and comprising a first compression stage, with an alternating bi-directional piston separating a first chamber and a second chamber, and a first fuel burner forming a heat source coupled to the first chamber, the thermal compressor forming a compression function of the reversible heat pump loop, the first and second chambers being fluidly connected between each other through a regenerator with a to-and-fro fluid movement;
a main exchanger forming a thermal interface between the compressible fluid circuit and the heating circuit; and
at least a portion of the heating circuit, wherein the second chamber of the compressor is cooled by a return branch of the at least the portion of the heating circuit.

2. The thermodynamic boiler according to claim 1, in which the thermodynamic boiler supplies heat to the heating circuit and the reversible heat pump loop draws heat from an external unit.

3. The thermodynamic boiler according to claim 2, also comprising a supplementary device, the supplementary device comprising an auxiliary burner, distinct from the first fuel burner, and a supplementary exchanger arranged on the heating circuit.

4. The thermodynamic boiler according to claim 1, in which the compressible fluid is R744.

5. The thermodynamic boiler according to claim 1, comprising a modulation unit and a motor provided to regulate a rotation speed of the compressor.

6. The thermodynamic boiler according to claim 1, in which the heat pump loop comprises a compressible gas work circuit and a glycol water circuit.

7. The thermodynamic boiler according to claim 1, in which the compressor comprises a second compression stage in series with the first compression stage.

8. The thermodynamic boiler according to claim 7, in which the compressor comprises a third compression stage.

9. The thermodynamic boiler according to claim 7, in which the first and second compression stages are independent.

10. The thermodynamic boiler according to claim 1, comprising an air preheater at an inlet to the first fuel burner.

11. The thermodynamic boiler according to claim 1, wherein the return branch of the at least the portion of the heating circuit first passes in at least the main exchanger, and then in a cold section coupled to the second chamber of the thermal compressor.

12. The thermodynamic boiler according to claim 1, in which the return of the heating circuit passes, after cooling the compressor, into a supplementary exchanger.

13. The thermodynamic boiler according to claim 1, in which the main exchanger comprises a high temperature exchanger and a low temperature exchanger.

14. The thermodynamic boiler according to claim 1, comprising a domestic hot water circuit.

15. The thermodynamic boiler according to claim 14, comprising a main exchanger forming a thermal interface between a compressible fluid circuit, of the reversible heat pump loop, and the heating circuit, in which the main exchanger comprises a high temperature exchanger and a low temperature exchanger, and in which the domestic hot water is heated by means of the high temperature exchanger which is arranged on the compressible fluid circuit directly at an outlet of the thermal compressor.

16. The thermodynamic boiler according to claim 14, in which the thermodynamic boiler takes heat from the heating circuit, and delivers this heat either into the domestic hot water circuit or into an external unit, to provide a cooling function.

* * * * *